United States Patent
Unal (10) Patent No.: US 11,350,180 B2
(45) Date of Patent: May 31, 2022

(54) MONITORING APPARATUS, ELECTRONIC DEVICE, SINGLE CABLE SATELLITE SYSTEM, AND MONITORING METHOD

(71) Applicant: VESTEL ELEKTRONIK SANAYI VE TICARET A.S., Manisa (TR)

(72) Inventor: Olgun Unal, Izmir (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 17/265,345

(22) PCT Filed: Aug. 2, 2018

(86) PCT No.: PCT/EP2018/070982
§ 371 (c)(1),
(2) Date: Feb. 2, 2021

(87) PCT Pub. No.: WO2020/025136
PCT Pub. Date: Feb. 6, 2020

(65) Prior Publication Data
US 2021/0306716 A1      Sep. 30, 2021

(51) Int. Cl.
*H04N 21/647* (2011.01)
*H04N 21/61* (2011.01)

(52) U.S. Cl.
CPC ... *H04N 21/64723* (2013.01); *H04N 21/6143* (2013.01)

(58) Field of Classification Search
None
See application file for complete search history.

(56) References Cited

U.S. PATENT DOCUMENTS

| | | | | |
|---|---|---|---|---|
| 4,745,599 A | * | 5/1988 | Raychaudhuri | .... H04B 7/18528 370/348 |
| 6,711,139 B1 | * | 3/2004 | Endo | .................. H04B 7/18528 370/322 |

(Continued)

FOREIGN PATENT DOCUMENTS

| WO | WO-02084476 A1 * | 10/2002 | ........... H04B 7/2043 |
|---|---|---|---|
| WO | WO-2006120203 A2 * | 11/2006 | ............. H04H 40/90 |

OTHER PUBLICATIONS

PCT International Search Report and Written Opinion of the International Searching Authority dated Sep. 19, 2018, Application No. PCT/EP2018/070982, Applicant Vestel Elektronik Sanayi Ve Ticaret A. S., 14 Pages.

*Primary Examiner* — William J Kim
(74) *Attorney, Agent, or Firm* — Brooks Kushman P.C.

(57) ABSTRACT

A monitoring apparatus for monitoring a coaxial cable for control signal collisions comprises an input port configured to couple the monitoring apparatus to the coaxial cable for detecting control signals that are transmitted on the coaxial cable, and a data interface configured to couple the monitoring apparatus to a data network and configured to output the detected control signals. Further, an electronic device for receiving satellite signals via a coaxial cable comprises a signal interface configured to couple the electronic device to the coaxial cable, a data interface configured to couple the electronic device to a monitoring apparatus, and a device control unit configured to transmit control signals via the signal interface on the coaxial cable and to query the monitoring apparatus via the data interface for presence of respective control signals on the coaxial cable. In addition, a single cable satellite system and a monitoring method are also provided.

16 Claims, 4 Drawing Sheets

(56) References Cited

U.S. PATENT DOCUMENTS

| | | | |
|---|---|---|---|
| 7,954,127 B2* | 5/2011 | James | H04N 7/20 |
| | | | 725/81 |
| 2005/0054288 A1* | 3/2005 | Agarwal | H04B 7/2043 |
| | | | 455/13.1 |
| 2006/0174282 A1 | 8/2006 | Dennison et al. | |
| 2008/0298516 A1* | 12/2008 | Norin | H04H 40/90 |
| | | | 375/344 |
| 2011/0167459 A1* | 7/2011 | Holme | H04H 20/63 |
| | | | 725/71 |
| 2011/0281543 A1* | 11/2011 | White | H04L 12/2861 |
| | | | 455/337 |
| 2012/0264365 A1* | 10/2012 | Wong | H04N 21/426 |
| | | | 455/3.02 |
| 2012/0282870 A1* | 11/2012 | Eitel | H04H 40/90 |
| | | | 455/150.1 |
| 2014/0118007 A1* | 5/2014 | Eitel | G01R 27/28 |
| | | | 324/615 |
| 2014/0256246 A1 | 9/2014 | Eitan et al. | |
| 2017/0344500 A1* | 11/2017 | Mstowski | G06F 15/173 |
| 2018/0027289 A1* | 1/2018 | Chang | H04H 20/22 |
| | | | 455/3.02 |
| 2020/0028572 A1* | 1/2020 | Gaske | H04W 16/28 |

\* cited by examiner

MONITORING APPARATUS, ELECTRONIC DEVICE, SINGLE CABLE SATELLITE SYSTEM, AND MONITORING METHOD

CROSS-REFERENCE TO RELATED APPLICATIONS

This application is the U.S. national phase of PCT Application No. PCT/EP2018/070982 filed on Aug. 2, 2018, the disclosure of which is incorporated in its entirety by reference herein.

TECHNICAL FIELD

The disclosure relates to a monitoring apparatus. Further, the present disclosure relates to an electronic device, a single cable satellite system and a monitoring method.

BACKGROUND

Although applicable to any single cable signal transmission system, the present disclosure will mainly be described in conjunction with single cable satellite systems.

Today TV and radio programs may be received via a plurality of different distribution channels. Especially in remote locations, satellite based TV and radio reception is widely used. The advantage of such satellite based TV and radio reception is that no terrestrial infrastructure must be provided and that even remote locations may be reached with satellite signals easily.

Such satellite installations in buildings may be simple installations with, e.g., only a single satellite dish and a single TV set that is connected to the satellite dish. In larger buildings, a plurality of TV sets or set-top boxes may be served by a single satellite dish with a single LNB. In such systems a multiswitch may be used that distributes the signals from a quattro LNB to a plurality of devices like TVs and set-top boxes.

However, the use of a multiswitch greatly increases the cabling effort necessary to perform the installation. Accordingly, as alternative to the multiswitch the so called single cable or unicable installation was introduced.

A unicable installation enables delivery of satellite signals to multiple users over a single coaxial cable, and eliminates the numerous cables required to support consumer electronics devices.

In a unicable installation each satellite receiver is assigned a dedicated user band. Such a user band has a bandwidth approximately the same as a transponder. The receiver may request a particular transponder frequency via so called DiSEqC commands or DiSEqC control signals. In the LNB or distribution unit a mixer converts the received satellite signals to the correct user bands for the respective receivers. The converted signals of the various users are then combined and sent via the single coaxial cable to the receivers. The combined signal may, e.g., be tapped or split to reach every user.

However, in such installations, collisions of the DiSEqC commands may occur. This may lead to a receiver receiving the wrong satellite signals in his user band.

Accordingly, there is a need for improving control signal handling in unicable satellite installations.

SUMMARY

The present disclosure provides a monitoring apparatus, an electronic device, a single cable satellite system, and a monitoring method.

A monitoring apparatus for monitoring a coaxial cable for control signal collisions may comprise an input port configured to couple the monitoring apparatus to the coaxial cable for detecting control signals that are transmitted on the coaxial cable, and a data interface configured to couple the monitoring apparatus to a data network and configured to output the detected control signals.

An electronic device for receiving satellite signals via a coaxial cable may comprise a signal interface configured to couple the electronic device to the coaxial cable, a data interface configured to couple the electronic device to a monitoring apparatus, and a device control unit configured to transmit control signals, especially DiSEqC control signals, via the signal interface on the coaxial cable and to query the monitoring apparatus via the data interface for the presence of the respective control signals on the coaxial cable.

A single cable satellite system may comprise a satellite signal receiver, e.g., a unicable enabled LNB, a single coaxial cable that is coupled to the satellite signal receiver, a monitoring apparatus according to the present disclosure that is coupled to the single coaxial cable, and at least one electronic device according to the present disclosure that is coupled to the single coaxial cable.

A monitoring method for monitoring a coaxial cable for control signal collisions may comprise transmitting control signals, especially DiSEqC control signals, via a signal interface of an electronic device on the coaxial cable, detecting the control signals that are transmitted on the coaxial cable in a monitoring apparatus, querying for the presence of the respective control signals on the coaxial cable with the electronic device via a data network, and outputting the detected control signals via the data network with the monitoring apparatus.

The present disclosure is based on the finding that it is difficult to detect collisions of DiSEqC commands or DiSEqC control signals in electronic devices, like, e.g., TV sets or set-top boxes, of single cable satellite installations, also called unicable satellite installations.

The present disclosure therefore provides a system that comprises a second communication channel that allows the single electronic devices to verify if their DiSEqC control signals for the satellite signal receiver, e.g., the LNB of the satellite system, was transmitted correctly via the coaxial cable to the satellite signal receiver. It is understood, that in this context the term electronic device refers to any device that is capable of receiving the satellite signals via a coaxial cable and that is capable of transmitting control signals, like, e.g., DiSEqC control signals, via the single coaxial cable.

This second channel is provided by the monitoring apparatus that is capable of providing information about DiSEqC control signals that are transmitted on the coaxial cable via this second channel. The second channel may, e.g., be any type of data channel, like, e.g., a wired or wireless data network. It is understood, that such a wired or wireless data network may, e.g., comprise an Ethernet network, an optical network, a wireless network like a WIFI network or any other type of network. It is further understood, that such a network may comprise a plurality of different elements, like, e.g., routers, switches and the like that interconnect the monitoring apparatus and the electronic devices of the single cable satellite system.

The single cable satellite system according to the present disclosure allows the electronic devices to query the monitoring apparatus and verify if their DiSEqC control signals are correctly transmitted via the single coaxial cable to the satellite signal receiver. To this end, an electronic device may, e.g., establish data communication with the monitoring apparatus via the data interface e.g., via a WIFI network, and query the DiSEqC control signals that the monitoring apparatus identified on the coaxial cable.

In case that only one of the electronic devices transmits a DiSEqC control signal, the monitoring apparatus will detect this signal and provide respective information via the data interface to the electronic device. If, however, multiple DiSEqC control signals are transmitted concurrently and collide with each other, the monitoring apparatus will not detect a correct DiSEqC control signal. Therefore, in this case the monitoring apparatus will not provide information about a detected DiSEqC control signal to the electronic apparatus. The electronic apparatus will therefore know that a control signal collision has happened and may react accordingly.

Summing up, the present disclosure provides a reliable method for electronic devices to determine whether their DiSEqC control signals are correctly transmitted to the satellite signal receiver or not. This allows the electronic devices to take respective actions if a DiSEqC control signal is not correctly transmitted.

It is understood, that the monitoring apparatus may, e.g., be a dedicated apparatus, like, e.g., an embedded system with a coaxial cable interface and with a network interface. It is understood, that as alternative the monitoring apparatus may, e.g., also be integrated with the satellite signal receiver. For example, an enhanced LNB may be provided that comprises at least one coaxial cable port and a network port or a WIFI interface. Such an enhanced LNB may, e.g., receive and forward the satellite signals and at the same time provide the function of the monitoring apparatus. Such a LNB may, e.g., be provided with electrical energy via the coaxial cable or in case of a present network port via an Ethernet cable, e.g., via power over Ethernet.

Further embodiments of the present disclosure are subject of the following description, referring to the drawings.

In an embodiment, the monitoring apparatus may comprise a control unit configured to analyze signals detected on the coaxial cable for the presence of DiSEqC control signals, wherein the control unit is further configured to output the detected DiSEqC control signals via the data interface, e.g., on request by a device that is coupled to the data interface.

The monitoring apparatus may, e.g., comprise a microcontroller or another kind of processor that is capable of receiving the control signals that are transmitted via the coaxial cable. To this end the monitoring apparatus may, e.g., comprise a DiSEqC control signal decoder that is coupled to the microcontroller or processor.

In another embodiment, the control unit may be configured to decode the signals detected on the coaxial cable and to detect a collision of at least two DiSEqC control signals on the coaxial cable and to output a respective information via the data interface.

As alternative to the above mentioned DiSEqC control signal decoder, the logic of the DiSEqC control signal decoder may be implemented in the microcontroller or processor, e.g., as firmware, or in a dedicated element, like, e.g., an ASIC, FPGA or the like. In this case, the control unit may not only perform a decoding of DiSEqC control signals. Instead, the control unit may also detect partial DiSEqC control signals that are at some part covered by another colliding DiSEqC control signal.

In this case, the control unit may, e.g., output via the data interface information about the detected collision. Such information may, e.g., be actively transmitted by the control unit via the data interface, e.g., in a broadcast message or in dedicated messages. As alternative, the DiSEqC control signal decoder may also comprise the capability to detect the collision and provide respective information to the control unit.

It is understood, that the transmission of data between the monitoring apparatus and the electronic devices may, e.g., be performed based on proprietary high level protocols or other protocols like MQTT, e.g., on top of a TCP/IP or UDP communication.

In a further embodiment, if the control unit detects a collision of at least two DiSEqC control signals on the coaxial cable, the control unit may be configured to output a partial DiSEqC control signal that is received by the control unit until the collision occurs via the data interface.

A collision between two DiSEqC control signals may occur at any point in time during the transmission of the first DiSEqC control signal. This means that at least part of the respective DiSEqC control signal may be transmitted correctly. Therefore, the control unit may at least decode a section of the first DiSEqC control signal correctly.

The control unit may then provide the information that could be decoded to the electronic devices. The above said about the transmission of data between the monitoring apparatus and the electronic devices also applies in this regard.

This allows the electronic devices that emitted the DiSEqC control signals and that caused the collision to determine which one of the devices started transmitting the DiSEqC control signal first. The electronic devices may, e.g., start comparing the DiSEqC control signals that they emitted with the section of the received DiSEqC control signal that is provided by the control unit of the monitoring apparatus. The electronic apparatus that sent the DiSEqC control signal that matches the section of the received DiSEqC control signal that is provided by the control unit of the monitoring apparatus may determine that it was the first electronic apparatus to send a DiSEqC control signal.

This electronic device may then for example immediately start retransmitting the DiSEqC control signal. The other electronic device in contrast may, e.g., wait for a predetermined amount of time until it retransmits the respective DiSEqC control signal.

The other electronic device may also wait for an arbitrary or random amount of time that is at least as long as a DiSEqC control signal and as long as a multiple of the length of the DiSEqC control signal. Especially in installations with multiple electronic devices this provides for a sequential transmission of the DiSEqC control signals even if more than two electronic devices caused the initial collision.

In an embodiment, the device control unit may be configured to retransmit control signals that are transmitted by the device control unit via the coaxial cable and are not reported as present on the coaxial cable by the monitoring apparatus.

The device control unit may, e.g., comprise a dedicated unit or may be implemented in a processor of the electronic device.

In a further embodiment, the device control unit may be configured to receive from the monitoring apparatus a partial DiSEqC control signal and immediately retransmit the last transmitted control signal if the partial DiSEqC control signal corresponds to said last transmitted control signal, and wherein the device control unit may be configured to retransmit the last transmitted control signal after a predetermined amount of time if the partial DiSEqC control signal does not correspond to said last transmitted control signal.

The partial DiSEqC control signal implicitly discloses that a collision happened on the coaxial cable. However, it is also possible that a protocol is implemented that allows signaling from the monitoring apparatus to the electronic devices if a complete DiSEqC control signal or only a partial DiSEqC control signal was detected.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION

Figure 1:
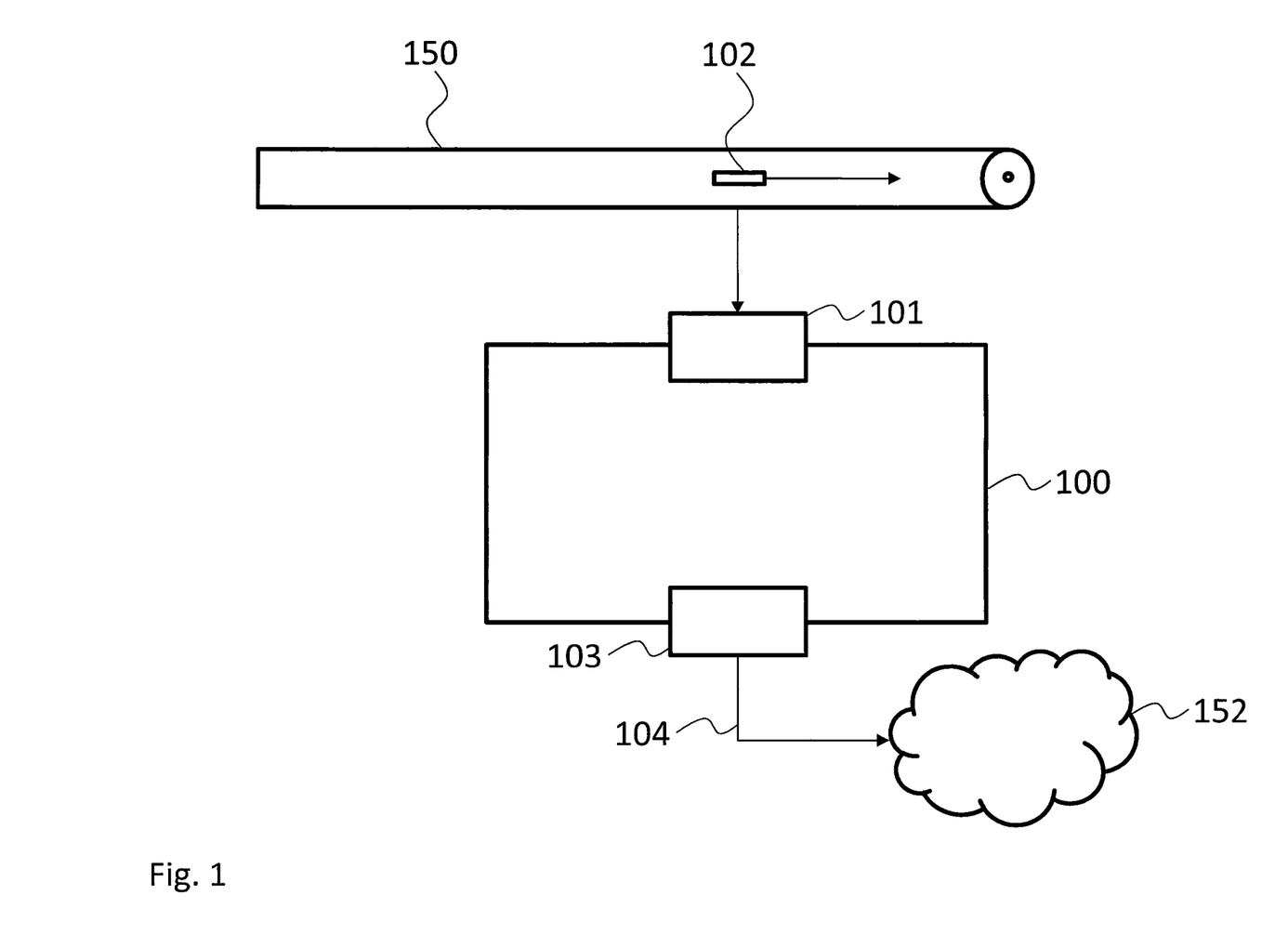
FIG. 1 shows a block diagram of an embodiment of a monitoring apparatus according to the present disclosure.

FIG. 1 shows a block diagram of a monitoring apparatus 100. The monitoring apparatus 100 comprises an input port 101 and a data interface 103. The input port 101 serves to connect the monitoring apparatus 100 to a coaxial cable 150 for reading control signals 102 that are transported on the coaxial cable 150. The data interface 103 couples the monitoring apparatus 100 to a data network 152, e.g., a local area network based on Ethernet or WIFI.

The monitoring apparatus 100 will in case that a control signal 102 is detected on the coaxial cable 150 output the detected control signal 104 via the data interface 103. It is understood, that the terms "output the detected control signal 104" may also refer to outputting an information regarding the detected control signal 104.

The detected control signal 104 may then be provided to a single electronic device or to a plurality of electronic devices. The detected control signal 104 may, e.g., be provided via data network 152 to a single electronic device via a dedicated communication, like, e.g., a directed TCP/IP or UDP based communication. As alternative a broadcast message may be emitted by the monitoring apparatus 100 that may be provided to a plurality of electronic devices via the data network 152. It is understood, that high-level protocols, like, e.g., MQTT, may be used to distribute the detected control signal 104.

Figure 2:
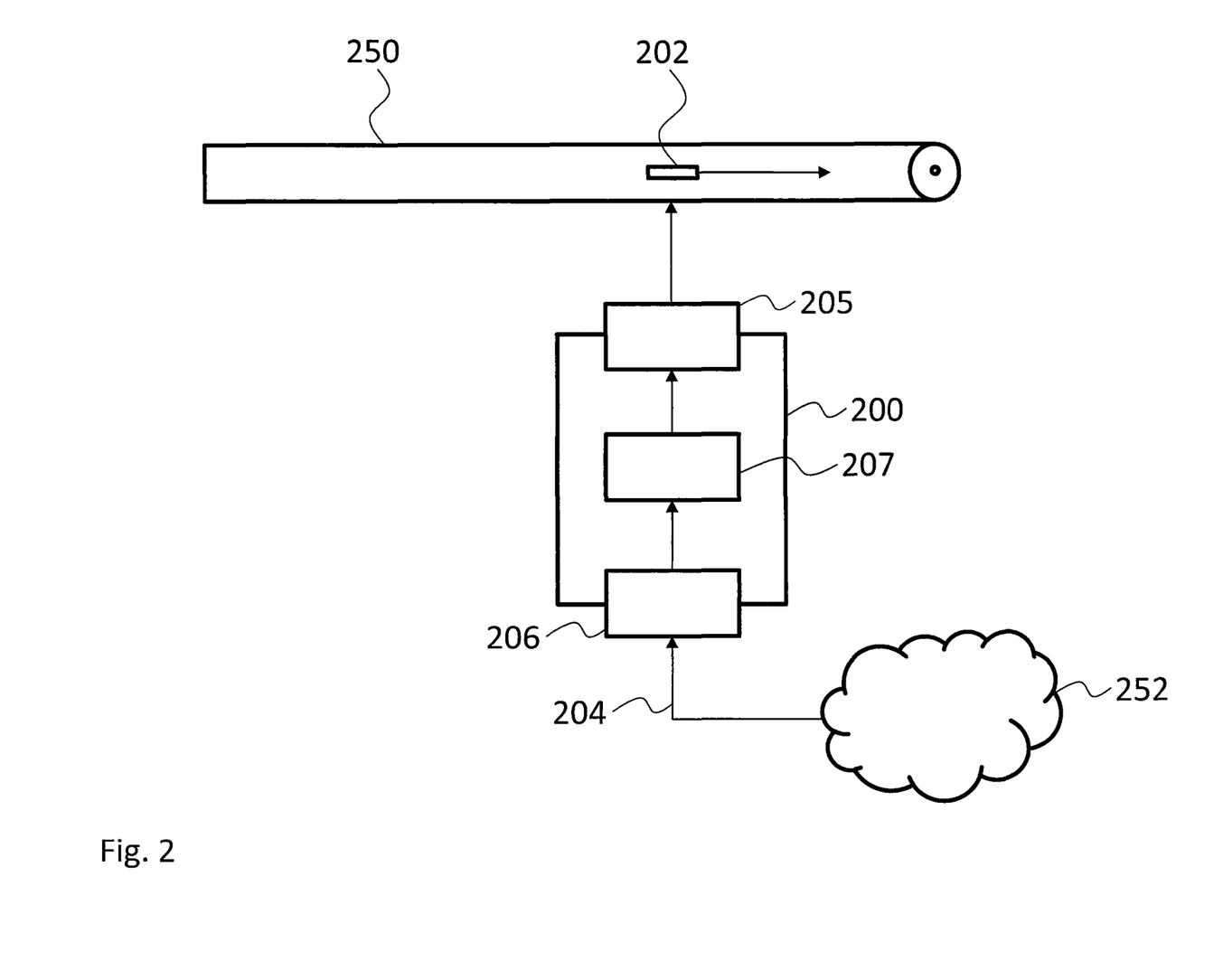
FIG. 2 shows a block diagram of an embodiment of an electronic device according to the present disclosure.

FIG. 2 shows a block diagram of an electronic device 200. The electronic device 200 comprises a signal interface 205, a data interface 206 and a device control unit 207 that is coupled to the signal interface 205 and the data interface 206. The signal interface 205 couples the electronic device 200 to a coaxial cable 250, and the data interface 206 couples the electronic device 200 to a data network 252.

The device control unit 207 may, e.g., transmit control signals 202, like, e.g., DiSEqC control signals, via the signal interface 205 on the coaxial cable 250. This may, e.g., be the case when a user switches to a TV channel that is transmitted via a transponder that is not currently provided on the coaxial cable 250.

After transmitting such a control signal 202 on the coaxial cable 250, the device control unit 207 may then query a monitoring apparatus via the data interface 206 and the data network 252 for the presence of the respective control signal 202 on the coaxial cable 250. It is understood, that the electronic device 200 may also be coupled to a monitoring apparatus directly, i.e., without the data network 252. The monitoring apparatus may in this case, e.g., provide a WIFI access point.

In case that a transmitted control signal 202 is not detected on the coaxial cable 250 and reported by the monitoring apparatus, a collision of two control signals 202 may have occurred and the device control unit 207 may perform respective actions. For example, the device control unit 207 may retransmit the respective control signal(s) 202. Such a retransmission may happen immediately or after a random amount of time.

Further, the device control unit 207 may, e.g., receive from the monitoring apparatus a partial DiSEqC control signal and immediately retransmit the last transmitted control signal 202 if the partial DiSEqC control signal corresponds to said last transmitted control signal 202. The device control unit 207 may however retransmit the last transmitted control signal 202 after a predetermined amount of time if the partial DiSEqC control signal does not correspond to said last transmitted control signal 202. In this regard, the partial DiSEqC control signal corresponding to the last transmitted control signal 202 may refer to at least some bits or information units, e.g., starting from the first bit, of the two signals corresponding to each other or being equal.

Figure 3:
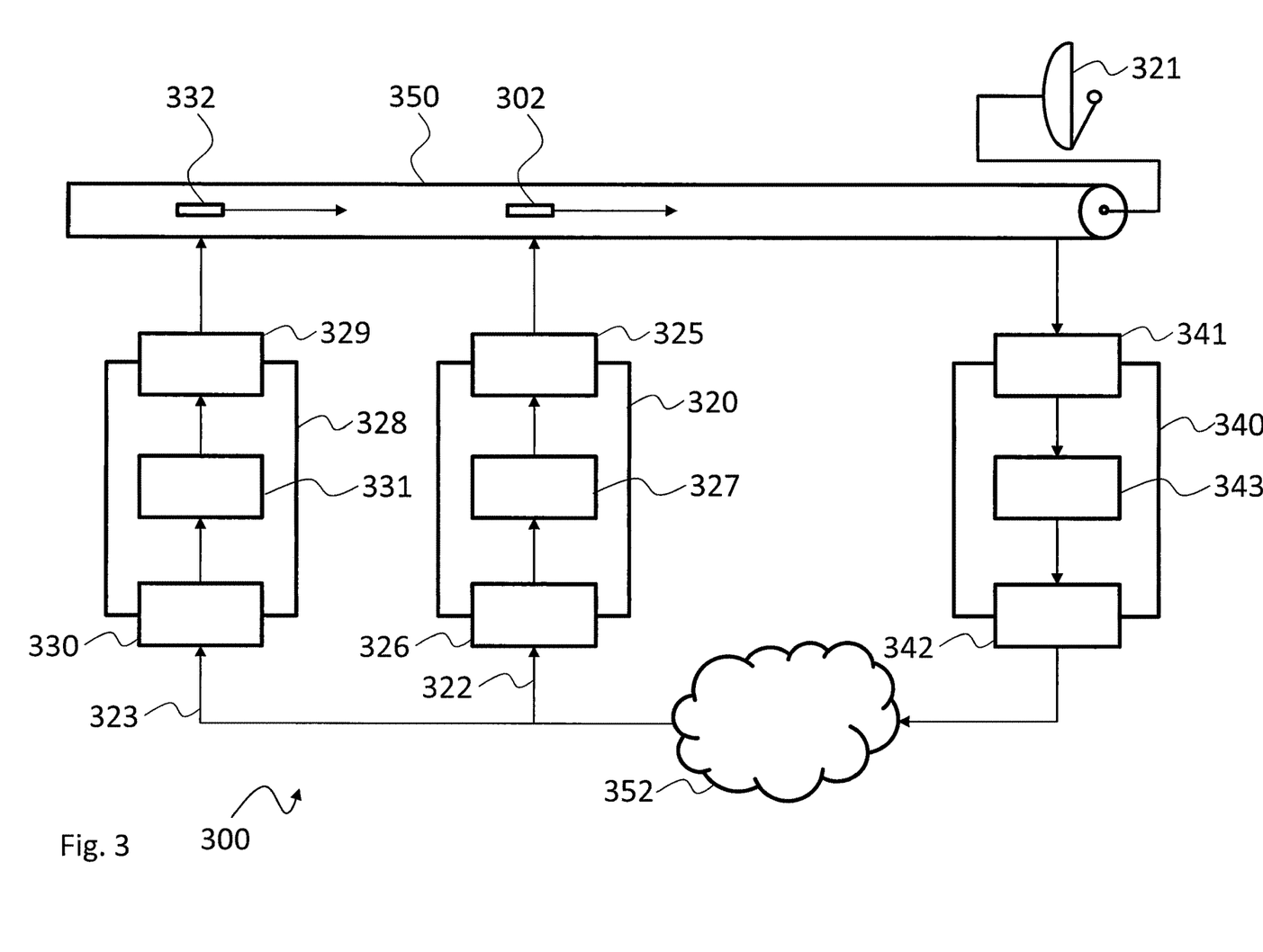
FIG. 3 shows a block diagram of an embodiment of a single cable satellite system according to the present disclosure.

FIG. 3 shows a block diagram of a single cable satellite system 300. The single cable satellite system 300 comprises a coaxial cable 350 that is coupled to a satellite signal receiver 321 and may transport satellite signals and control signals 302, 332. In the single cable satellite system 300 two exemplary electronic devices 320, 328 are coupled to the coaxial cable 350.

Each one of the electronic devices 320, 328 comprises a signal interface 325, 329, a data interface 326, 330 and a device control unit 327, 331 that is coupled to the signal interface 325, 329 and the data interface 326, 330. The explanations regarding the electronic device 200 apply to the electronic devices 320, 328 mutatis mutandis.

In the single cable satellite system 300 both electronic devices 320, 328 may transmit control signals 302, 332 to the electronic devices 320, 328 via the coaxial cable 350. If both electronic devices 320, 328 transmit control signals 302, 332 at the same time, the control signals 302, 332 may collide and no control signal will arrive correctly at the satellite signal receiver 321.

In order to detect such signal collisions, the single cable satellite system 300 provides the monitoring apparatus 340 that allows the electronic devices 320, 328 to query if their control signals 302, 332 are correctly provided to the satellite signal receiver 321. The explanations regarding the monitoring apparatus 100 of FIG. 1 also apply to the monitoring apparatus 340. In addition, the monitoring apparatus 340 comprises a control unit 343 that is coupled to the input port 341 and the data interface 342.

The control unit 343 may analyze signals detected on the coaxial cable 350 for the presence of control signals 302, 332, like, e.g., DiSEqC control signals. Further the control unit 343 may output the detected DiSEqC control signals 322 via the data interface 342 and the data network 352 to the electronic devices 320, 328.

The control unit 343 may, e.g., decode the signals detected on the coaxial cable 350 and detect a collision of at least two DiSEqC control signals 302, 332 on the coaxial cable 350. A collision may, e.g., be detected if the control unit 343 starts decoding one of the control signals 302, 332 correctly and at any point of the respective control signal 302, 332 cannot further decode the respective control signal 302, 332 correctly. In this case the control unit 343 may, e.g., output a respective information via the data interface 342.

If the control unit 343 detects a collision of at least two control signals 302, 332 on the coaxial cable 350, the control unit 343 may also output a partial DiSEqC control signal 323 that is received by the control unit 343 until the collision occurs via the data interface 342.

For sake of clarity in the following description of the method based FIG. 4 the reference signs used above in the description of apparatus based FIGS. 1-3 will be maintained.

Figure 4:
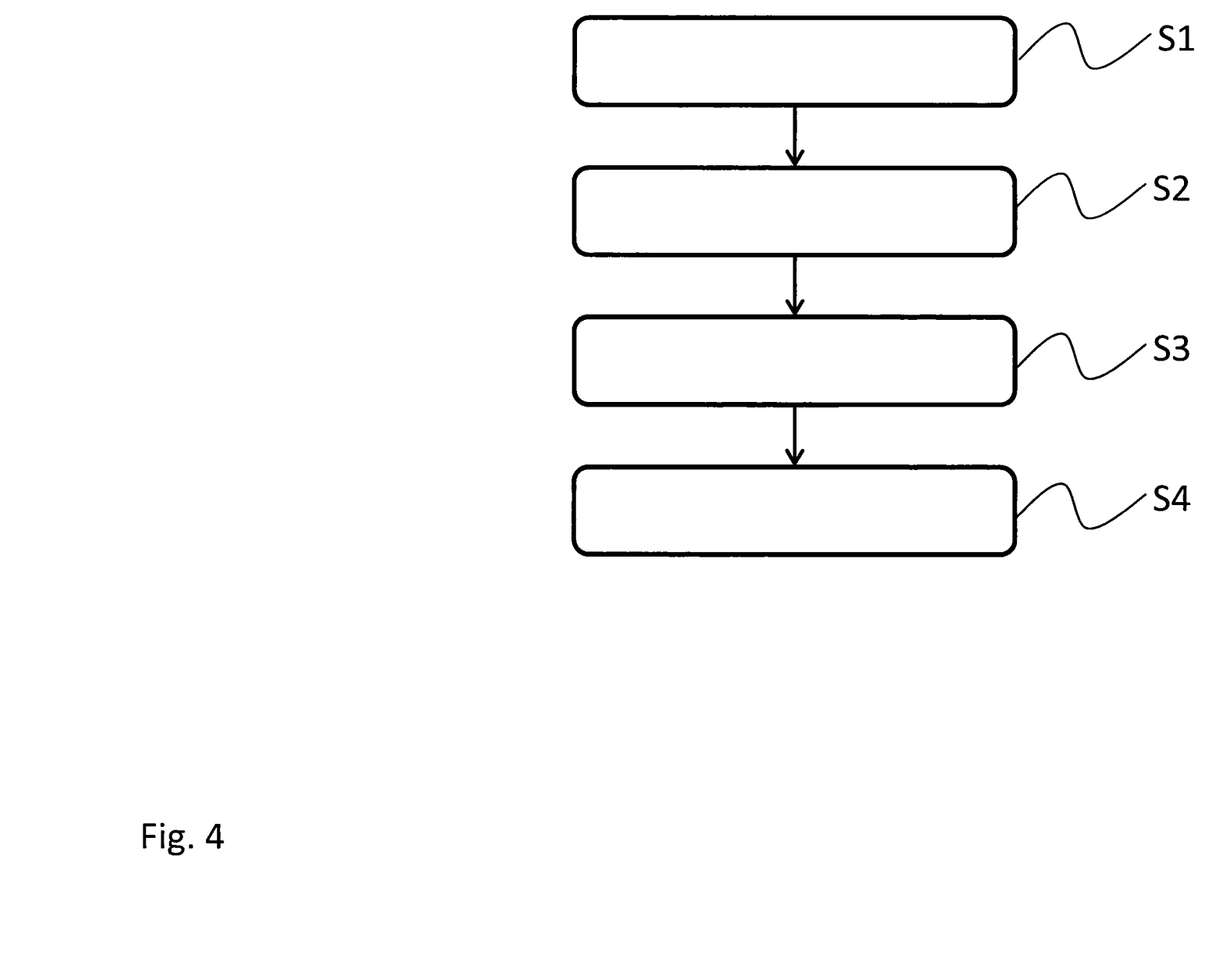
FIG. 4 shows a flow diagram of an embodiment of a monitoring method according to the present disclosure.

FIG. 4 shows a flow diagram of a monitoring method for monitoring a coaxial cable 150, 250, 350 for control signal collisions.

The monitoring method comprises transmitting S1 control signals 102, 202, 302, 332, especially DiSEqC control signals, via the signal interface 205, 325, 329 of an electronic device 200, 320, 328 on the coaxial cable 150, 250, 350, detecting S2 the control signals 102, 202, 302, 332 that are transmitted on the coaxial cable 150, 250, 350 in a monitoring apparatus 100, 340, querying S3 for the presence of the respective control signals 102, 202, 302, 332 on the coaxial cable 150, 250, 350 with the electronic device 200, 320, 328 via a data network 152, 252, 352, and outputting S4 the detected control signals 104, 204, 304 via the data network 152, 252, 352 with the monitoring apparatus 100, 340.

The monitoring method may also comprise in the monitoring apparatus 100, 340 analyzing signals detected on the coaxial cable 150, 250, 350 for the presence of DiSEqC control signals, and outputting the detected DiSEqC control signals 322 via the data network 152, 252, 352.

In addition, or as alternative, the monitoring method may also comprise in the monitoring apparatus 100, 340 decoding the signals detected on the coaxial cable 150, 250, 350 and detecting a collision of at least two DiSEqC control signals on the coaxial cable 150, 250, 350 and outputting a respective information via the data network 152, 252, 352.

In the monitoring apparatus 100, 340 if a collision of at least two DiSEqC control signals on the coaxial cable 150, 250, 350 is detected, a partial DiSEqC control signal 323 that is present on the coaxial cable 150, 250, 350 until the collision occurs may be output via the data network 152, 252, 352 for the electronic devices 200, 320, 328.

Further, the monitoring method may comprise in the electronic device 200, 320, 328 retransmitting control signals 102, 202, 302, 332 that are transmitted via the coaxial cable 150, 250, 350 and are not reported as present on the coaxial cable 150, 250, 350.

In addition, or as alternative, the monitoring method may comprise in the electronic device 200, 320, 328 receiving a partial DiSEqC control signal 323 and immediately retransmitting the last transmitted control signal 102, 202, 302, 332 if the partial DiSEqC control signal 323 corresponds to the last control signal 102, 202, 302, 332 transmitted by the electronic device 200, 320, 328, or retransmitting said control signal 102, 202, 302, 332 after a predetermined amount of time if the partial DiSEqC control signal 323 does not correspond to said last transmitted control signal 102, 202, 302, 332.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The present disclosure provides a monitoring apparatus 100, 340 for monitoring a coaxial cable 150, 250, 350 for control signal collisions, the monitoring apparatus 100, 340 comprising an input port 101, 341 configured to couple the monitoring apparatus 100, 340 to the coaxial cable 150, 250, 350 for detecting control signals 102, 202, 302, 332 that are transmitted on the coaxial cable 150, 250, 350, a data interface 103, 342 configured to couple the monitoring apparatus 100, 340 to a data network 152, 252, 352 and configured to output the detected control signals 104, 204, 304. Further, the present disclosure provides an electronic device 200, 320, 328 for receiving satellite signals via a coaxial cable 150, 250, 350, the device comprising a signal interface 205, 325, 329 configured to couple the electronic device 200, 320, 328 to the coaxial cable 150, 250, 350, a data interface 206, 326, 330 configured to couple the electronic device 200, 320, 328 to a monitoring apparatus 100, 340 according to any one of the preceding claims, and a device control unit 207, 327, 331 configured to transmit control signals 102, 202, 302, 332, especially DiSEqC control signals, via the signal interface 205, 325, 329 on the coaxial cable 150, 250, 350 and to query the monitoring apparatus 100, 340 via the data interface 206, 326, 330 for the presence of the respective control signals 102, 202, 302, 332 on the coaxial cable 150, 250, 350. In addition, the present disclosure provides a respective single cable satellite system and a respective monitoring method.

| List of reference signs | |
| --- | --- |
| 100, 340 | monitoring apparatus |
| 101, 341 | input port |
| 102, 202, 302, 332 | control signal |
| 103, 342 | data interface |
| 104, 204, 304 | detected control signal |
| 343 | control unit |
| 200, 320, 328 | electronic device |
| 205, 325, 329 | signal interface |
| 206, 326, 330 | data interface |
| 207, 327, 331 | device control unit |
| 300 | single cable satellite system |
| 321 | satellite signal receiver |
| 322 | detected DiSEqC control signal |
| 323 | partial DiSEqC control signal |
| 150, 250, 350 | coaxial cable |
| 152, 252, 352 | data network |
| S1, S2, S3, S4 | method steps |

The invention claimed is:

1. A monitoring apparatus for monitoring a coaxial cable for control signal collisions, the monitoring apparatus comprising:

an input port configured to couple the monitoring apparatus to the coaxial cable for detecting control signals that are transmitted on the coaxial cable; and a data interface configured to couple the monitoring apparatus to a data network and configured to output the detected control signals.

2. The monitoring apparatus according to claim 1, further comprising a control unit configured to analyze signals detected on the coaxial cable for the presence of DiSEqC control signals, wherein the control unit is further configured to output the detected DiSEqC control signals via the data interface.

3. The monitoring apparatus according to claim 2, wherein the control unit is configured to decode the signals detected on the coaxial cable and to detect a collision of at least two DiSEqC control signals on the coaxial cable and to output a respective information via the data interface.

4. The monitoring apparatus according to claim 2, wherein if the control unit detects a collision of at least two DiSEqC control signals on the coaxial cable, the control unit is configured to output a partial DiSEqC control signal that is received by the control unit until the collision occurs via the data interface.

5. An electronic device for receiving satellite signals via a coaxial cable, the device comprising:
   a signal interface configured to couple the electronic device to the coaxial cable;
   a data interface configured to couple the electronic device to a monitoring apparatus; and
   a device control unit configured to transmit control signals via the signal interface on the coaxial cable and to query the monitoring apparatus via the data interface for the presence of the respective control signals on the coaxial cable.

6. The electronic device according to claim 5, wherein the device control unit is configured to retransmit control signals that are transmitted by the device control unit via the coaxial cable and are not reported as present on the coaxial cable by the monitoring apparatus.

7. The electronic device according to claim 6, wherein the device control unit is configured to receive from the monitoring apparatus a partial DiSEqC control signal and immediately retransmit the last transmitted control signal if the partial DiSEqC control signal corresponds to the last transmitted control signal, wherein the device control unit is configured to retransmit the last transmitted control signal after a predetermined amount of time if the partial DiSEqC control signal does not correspond to the last transmitted control signal.

8. The electronic device according to claim 5, wherein the control signals comprise DiSEqC control signals.

9. A single cable satellite system comprising:
   a satellite signal receiver;
   a single coaxial cable that is coupled to the satellite signal receiver;
   a monitoring apparatus according to claim 1 that is coupled to the single coaxial cable; and
   an electronic device that is coupled to the single coaxial cable, the electronic device including:
   a signal interface configured to couple the electronic device to the coaxial cable;
   a data interface configured to couple the electronic device to the monitoring apparatus; and
   a device control unit configured to transmit control signals on the coaxial cable and to query the monitoring apparatus via the data interface for the presence of the respective control signals on the coaxial cable.

10. A monitoring method for monitoring a coaxial cable for control signal collisions, the monitoring method comprising:
    transmitting control signals via a signal interface of an electronic device on the coaxial cable;
    detecting the control signals that are transmitted on the coaxial cable in a monitoring apparatus;
    querying for presence of the respective control signals on the coaxial cable with the electronic device via a data network; and
    outputting the detected control signals via the data network with the monitoring apparatus.

11. The monitoring method according to claim 10, comprising in the monitoring apparatus analyzing signals detected on the coaxial cable for presence of DiSEqC control signals, and outputting the detected DiSEqC control signals via the data network.

12. The monitoring method according to claim 10, comprising in the monitoring apparatus decoding the signals detected on the coaxial cable and detecting a collision of at least two DiSEqC control signals on the coaxial cable and outputting a respective information via the data network.

13. The monitoring method according to claim 10, wherein in the monitoring apparatus if a collision of at least two DiSEqC control signals on the coaxial cable is detected, a partial DiSEqC control signal that is present on the coaxial cable until the collision occurs is output via the data network.

14. The monitoring method according to claim 10, comprising in the electronic device retransmitting control signals that are transmitted via the coaxial cable and are not reported as present on the coaxial cable.

15. The monitoring method according to claim 10, comprising in the electronic device receiving a partial DiSEqC control signal and immediately retransmitting the last transmitted control signal if the partial DiSEqC control signal corresponds to the last control signal transmitted by the electronic device, or retransmitting the last transmitted control signal after a predetermined amount of time if the partial DiSEqC control signal does not correspond to the last transmitted control signal.

16. The monitoring method according to claim 10, wherein the control signals comprise DiSEqC control signals.

* * * * *